Aug. 4, 1942.                J. VENOLIA                 2,292,020
           WATTLE-STOP SANITARY COLLECTIVE POULTRY HOUSE WATER TROUGH
                           Filed Oct. 7, 1941
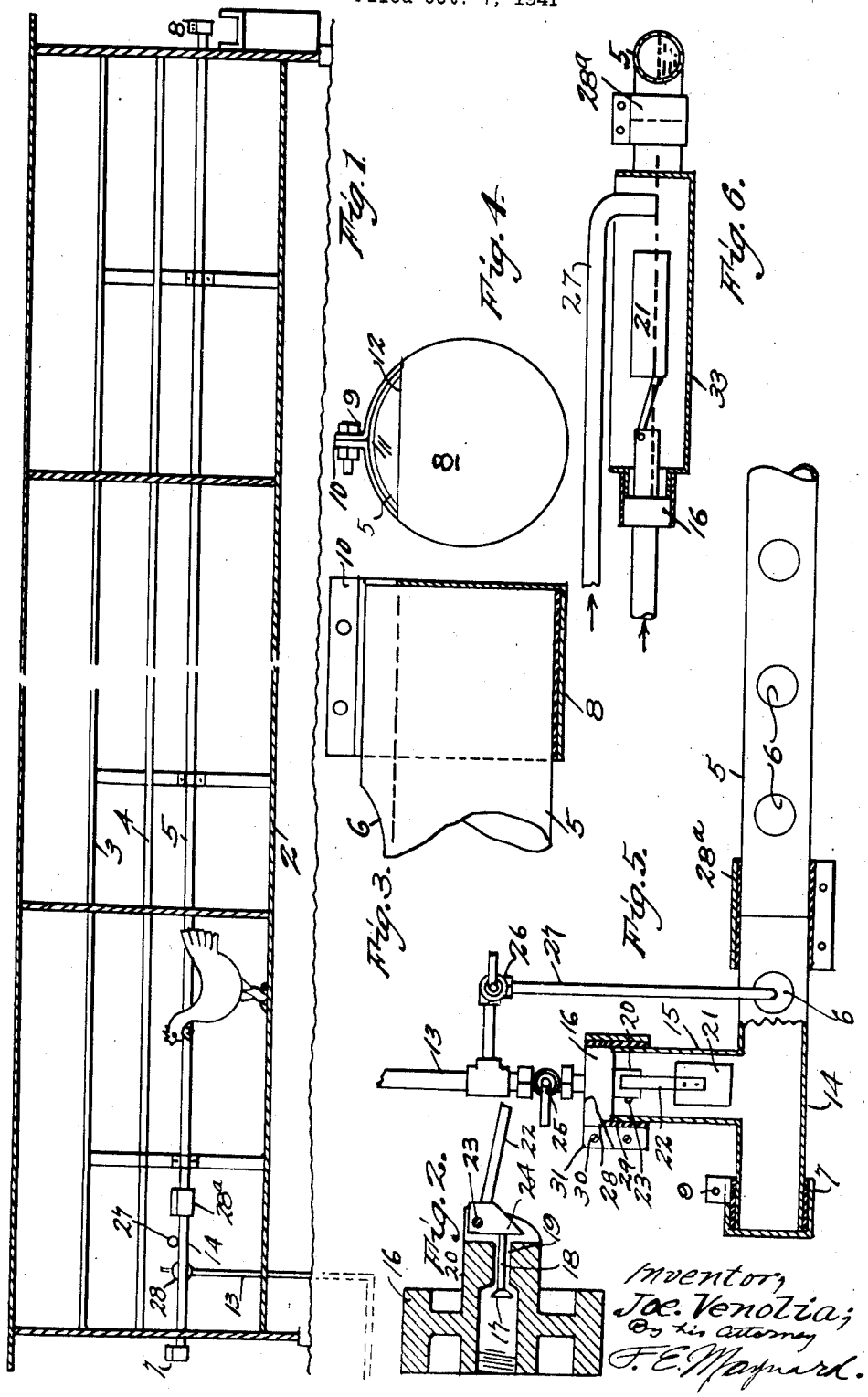

Patented Aug. 4, 1942

2,292,020

UNITED STATES PATENT OFFICE 2,292,020

WATTLE-STOP, SANITARY, COLLECTIVE, POULTRY HOUSE WATER TROUGH

Joseph Venolia, Spadra, Calif.

Application October 7, 1941, Serial No. 413,956

3 Claims. (Cl. 119—78)

This invention is a poultry housing and watering means.

In the poultry industry on a large scale there are many hazards the most frequent of which are the direct result of unsanitary houses. Also, improper apparatus for the supply of ample fresh water is a common cause of chicken trouble.

If a chicken can get its wattles into a water container it then shakes its head violently and food and other detritus at the chicken's mouth are thrown to the floor and to other chickens and in this manner foul conditions soon arise.

One aim of this invention is to provide an arrangement of water trough in the poultry house to practically prevent the chickens from getting the head or the wattles into the water, first by the disposition of a droppings board above and so close to the trough as to prevent the chickens from standing on the trough, and second, by the provision of a trough of such a depth that the parts of the bill will strike a stop before much of the head will enter the trough, and third, by providing a tubular trough having holes in its top of a size and shape to allow only the partially opened bill to enter.

A further object of the invention is to provide a trough device having in view not only an ample, continuous supply of fresh water to a large number of chickens at one demand but importantly, to provide for the ready and entirely effective cleaning of the interior of the tube from end to end. And in connection with the water trough or tube device it is an object to provide a simple, reliable, automatically opening and supply-line pressure closed valve.

An object is to provide a watering tube which is light in weight, can be readily installed by ordinary laborer or farm hand, and particularly is of low cost, preferably being made of lightweight sheet metal.

The invention consists in certain advancements in the apparatus of the poultry industry, particularly on a large scale, as set forth in the ensuing disclosure and having, with the above, additional objects and advantages as hereinafter developed, and whose constructions, combinations and subcombinations, and details of means, and the manner of operation will be made manifest in the description of the herewith illustrative embodiments; it being understood that modifications, variations and adaptations may be made within the scope, principle and spirit of the invention as it is more particularly claimed presently.

Figure 1 is a vertical, longitudinal section of a hen house, with an end to end watering tube installed.

Figure 2 is an axial section of the automatic, line-pressure closed level control valve for the water trough or tube as it will hereinafter be termed.

Figure 3 is an axial section and Figure 4 is an outside end elevation of a removable, water gage cap of the tube.

Figure 5 is a sectional plan of the feed water hook-up of the pipe and tube system of Fig. 1.

Figure 6 is a sectional view showing a form in which water is supplied from an intermediate reservoir, with water supply means.

An elongate chicken house 2 is provided with longitudinal perch 3 parallel to and directly above a suitably wide droppings board 4, which protects the house floor and its sanitary advantage far offsets its cost since the board may be readily cleaned by access through a windowed back along the house; or the board may be removed in sections from time to time.

A long watering tube 5, Fig. 1, extends to and through the end walls of the house and is parallel to and sufficiently close to the droppings board 4, and under it, to prevent grown chickens from climbing onto the tube. This arrangement is to prevent fouling the water in the tube either from perch droppings or from chickens if not precluded from standing on the tube 5.

The tube 5 is preferably made of light weight sheet metal and of about one and three-quarter inches diameter and along its top are access holes 6 of about one and one-quarter inches diameter. These dimensions are found to be effective to prevent grown hens from dipping their bills to the bottom of the tube and drinking settled dregs and at the same time the wattles are kept out of the water.

A purpose of the invention is to provide for the quick, easy and effective interior cleaning of the tube while in place. To that end the ends of the tube are disposed out beyond the end walls of the house and caps 7 and 8 are telescoped over the tube ends and clinched in place by means of clamp bolts 9 passed through radial, parallel flanges 10 formed along a slot 11 which extends longitudinally of the top of the caps. Either or both of the caps may be of level gage forms by having their end walls cut away at the upper portion above a chordal line or lip 12 which will form a weir. Or one end cap, as 7, may be closed as in the case where the water pipe 13 is at one end of the house. The lip 12 is below the lower portions of the tube openings 6 to avoid overflow at these openings.

Means are provided to automatically control the flow of fresh water from the service pipe 13 to the watering tube 5 combined with means to give additional water at the tube in cases of hot weather or to meet peak loads by large numbers of chickens occasionally imposed on the system. In Fig. 5 there is shown a T-joint 14 having a stem 15 in which there is abutted the complementary cylindric body 16 of an automatic valve including a small head 17 on a shank 18 loosely slidable in the bore 19 of a hub 20 of the body.

The valve 17 closes outwardly under the service pressure in the supply pipe 13 and is sufficiently small in area to be repressible to open position by the action of a float 21, in the tube joint stem 15, on a lever 22 pivoted at 23 in the hub and having a toe 24 operative against the near end of the valve shank 18. When the water level falls below the weir gage level the float descends and its weight pushes the valve 17 open and as the normal level in the tube is reached the float rises and the line pressure shuts the valve 17. A service cock 25 can be closed at any time to stop flow to the valve 17. In case of demand a cock 26 in a by-pass branch 27 can be opened to let more water flow from the pipe 13 to the T-joint which opens to the drinking tube 5. The valve body 16 has an end butt fit against the end of the T-stem and a split clamp sleeve 28, lined with packing 29, is clinched about the abutted stem and body by bolts 30 passed through opposed flanges 31 along the split side of the sleeve.

The body of the said T-joint is likewise abutted against the near end of the corresponding size tube 5, Fig. 5, and these parts are clinched end to end by a like sleeve 28a. It will be seen that tubes 5 may be coupled to either or both ends of the T-joint or coupling 14.

Tubes of any length may be employed and as desired may be radiated from a central reservoir 33, Fig. 6, which will be provided with an automatic valve 16—17 of a capacity to supply a large number of chickens.

It is understood that a great variety of watering tube lay-outs combining features hereinabove set forth may be created.

By removing the end caps 7 and 8 a suitable, long brush can be inserted in the tube 5 and reciprocated while ample water is run into the tube so that this will be thoroughly cleaned internally.

What is claimed is:

1. Poultry apparatus including a house, and a top-perforated horizontal watering tube extending to and through each end wall of the house and having readily removed end caps outside the end walls to facilitate cleaning of the tube by endwise insertion and reciprocation of a suitable means, and said tube having at one end a section-enclosing an automatic valve and the cap at the opposite end having a drain control device to determine maximum water level and the valve having a float disposed in, and operative by a fall of level of, the water; whereby to obtain a normal water level in the tube at a point below the lowest edges of its top apertures.

2. The apparatus of claim 1; said section being arranged laterally of the length of the tube for passage of a cleaning tool without interference by the valve in said section.

3. In a poultry watering apparatus, a tube having readily removable caps on its ends and having access holes in its top, a T-member attached in the length of the tube and in communication therewith and an automatic water control valve disposed in the stem of the T-member whereby to facilitate endwise insertion of a cleaning means in the tube without interference by or removal of the valve.

JOSEPH VENOLIA.